United States Patent
Desai et al.

(10) Patent No.: US 9,909,442 B2
(45) Date of Patent: Mar. 6, 2018

(54) METHOD OF CONTROLLING A POSITION ACTUATION SYSTEM COMPONENT FOR A GAS TURBINE ENGINE

(71) Applicant: General Electric Company, Schenectady, NY (US)

(72) Inventors: Premal Desai, Rockledge, FL (US); John A. Striker, Hamilton, OH (US); Kenneth Paul Meiners, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 14/790,458

(22) Filed: Jul. 2, 2015

(65) Prior Publication Data

US 2017/0002681 A1    Jan. 5, 2017

(51) Int. Cl.
*F01D 1/00* (2006.01)
*F01D 17/24* (2006.01)
(Continued)

(52) U.S. Cl.
CPC .............. *F01D 17/24* (2013.01); *F02C 7/232* (2013.01); *F02C 9/263* (2013.01); *F02C 9/28* (2013.01);
(Continued)

(58) Field of Classification Search
None
See application file for complete search history.

(56) References Cited

U.S. PATENT DOCUMENTS 3,393,691 A   7/1968  Longstreet et al.
4,794,755 A   1/1989  Hutto, Jr. et al.
(Continued)

FOREIGN PATENT DOCUMENTS

EP    0053547 A1   6/1982
EP    0358139 A2   3/1990

OTHER PUBLICATIONS

European Search Report and Opinion issued in connection with corresponding EP Application No. 16177511.9 dated Nov. 28, 2016.

*Primary Examiner* — Pascal M Bui Pho
*Assistant Examiner* — Edwin Kang
(74) *Attorney, Agent, or Firm* — General Electric Company; Pamela A. Kachur (57) ABSTRACT

A method for controlling a position actuation system component in a gas turbine engine based on a modified proportional and integral control loop is provided. The method includes determining an error value between a demand signal for the position actuation system component and a position signal for the position actuation system component. The method also includes determining an integral gain scaler as a function of a scheduling parameter value and determining an integral gain based on the determined error value and the determined integral gain scaler. Additionally the method includes determining a proportional gain scaler as a function of the scheduling parameter value and determining a proportional gain based on the determined error value and the determined proportional portion gain scaler. The method adds the determined integral gain with the determined proportional gain to determine a null current value for the position actuation system component.

18 Claims, 4 Drawing Sheets

(51) Int. Cl.
*F02C 9/26* (2006.01)
*F02C 9/28* (2006.01)
*F02C 7/232* (2006.01)
*G01M 15/14* (2006.01)

(52) U.S. Cl.
CPC ......... *G01M 15/14* (2013.01); *F05D 2220/32* (2013.01); *F05D 2270/304* (2013.01); *F05D 2270/705* (2013.01)

(56) References Cited

U.S. PATENT DOCUMENTS

| | | |
|---|---|---|
| 4,887,695 A | 12/1989 | Kindler |
| 4,928,240 A | 5/1990 | Davison et al. |
| 5,094,208 A | 3/1992 | Adam et al. |
| 5,231,823 A | 8/1993 | Curran et al. |
| 5,233,512 A | 8/1993 | Gutz et al. |
| 5,279,107 A | 1/1994 | Meisner et al. |
| 5,692,485 A | 12/1997 | Maki et al. |
| 6,264,111 B1 | 7/2001 | Nicolson et al. |
| 6,282,884 B1* | 9/2001 | Adibhatla ............... F02C 9/28 60/39.281 |
| 6,972,976 B2 | 9/2005 | Tarkiainen et al. |
| 7,104,616 B2 | 9/2006 | Zierolf |
| 7,412,966 B2 | 8/2008 | Lewis et al. |
| 7,640,914 B2 | 1/2010 | Lewis et al. |
| 7,861,578 B2 | 1/2011 | Adibhatla et al. |
| 7,904,282 B2 | 3/2011 | Goebel et al. |
| 7,913,668 B2 | 3/2011 | Lewis et al. |
| 8,239,069 B2 | 8/2012 | Yuan et al. |
| 8,255,066 B2 | 8/2012 | Boiko et al. |
| 8,437,946 B2 | 5/2013 | Sasaki et al. |
| 8,689,539 B2 | 4/2014 | Lu et al. |
| 8,729,838 B2 | 5/2014 | Roxman et al. |
| 2010/0326077 A1* | 12/2010 | Snider ..................... F02C 9/28 60/734 |
| 2012/0161686 A1 | 6/2012 | Fugate et al. |
| 2013/0307447 A1* | 11/2013 | Rozman et al. ....... G05B 11/01 31/400.02 |

* cited by examiner

METHOD OF CONTROLLING A POSITION ACTUATION SYSTEM COMPONENT FOR A GAS TURBINE ENGINE

FIELD OF THE INVENTION

The present subject matter relates generally to a method for controlling a position actuation system component in a gas turbine engine.

BACKGROUND OF THE INVENTION

A gas turbine engine generally includes, in serial flow order, a compressor section, a combustion section, and a turbine section. In operation, air is provided from an inlet of the compressor section, where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section.

In particular configurations, the turbine section is mechanically coupled to the compressor section by a shaft extending along an axial direction of the gas turbine engine. Further, in certain aeroderivative gas turbine engines, the shaft is mechanically coupled to a load, such as a propeller in marine aeroderivative gas turbine engines, through a gear box.

Accordingly, in marine aeroderivative gas turbine engines a propeller speed may be controlled by a speed of the shaft, which may in turn be controlled by an amount of fuel provided to the combustion section. A fuel metering valve may be provided to control an amount of fuel provided to the combustion section. Thus, a propeller speed may be controlled by the fuel metering valve. In certain gas turbine engines, the fuel metering valve operates on a proportional and integral control loop. With such a configuration, an error value between a desired position of the fuel metering valve and an actual position of the fuel metering valve is used to determine a proportional gain and an integral gain, which are then summed to determine a null current value. The null current value sets a position of the fuel metering valve.

However, the inventors of the present disclosure have found that such a configuration may lead to, e.g., long startup times of the gas turbine engine and variations or fluctuations in the null current value. Accordingly, a method for controlling a position actuation system component, such as a fuel metering valve, within a gas turbine engine to decrease the startup time of the gas turbine engine would be useful. Moreover, a method for controlling a position actuation system component, such as a fuel metering valve, within a gas turbine engine to achieve more consistent null current values for the position actuation system component would be particularly beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method for controlling a position actuation system component in a gas turbine engine is provided. The method includes determining an error value between a demand signal for the position actuation system component and a position signal of the position actuation system component. The method also includes determining a scheduling parameter value of the gas turbine engine. The method also includes determining a null current value for the position actuation system component. Determining the null current value includes determining an integral gain scaler as a function of the scheduling parameter value, and determining an integral gain based on the determined error value and the determined integral gain scaler. Determining the null current value also includes determining a proportional gain scaler as a function of the scheduling parameter value, and determining a proportional gain based on the determined error value and determined proportional gain scaler. Moreover, determining the null current value includes adding the determined integral gain and the determined proportional gain to determine the null current value.

In another exemplary embodiment of the present disclosure, a gas turbine engine is provided including a combustor assembly disposed between a compressor section and a turbine section and a fuel metering valve controlling an amount of fuel provided to the combustor assembly. The gas turbine engine also includes a sensor for determining a scheduling parameter value of the gas turbine engine, and a controller operably connected to the fuel metering valve and the sensor. The controller is configured to determine an error value between a fuel metering valve demand signal and a position of the fuel metering valve. The controller is additionally configured to determine an integral gain scaler as a function of the scheduling parameter value, and determine an integral gain based on the determined error value and the determined integral gain scaler. The controller is further configured to determine a proportional gain scaler as a function of the scheduling parameter value, and determine a proportional gain based on the determined error value and determined proportional gain scaler. Moreover, the controller is configured to add the determined integral gain and the determined proportional gain to determine a null current value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As will be discussed below, aspects of the present disclosure may be used for controlling a position actuation system component of a gas turbine engine. For example, aspects of the present disclosure may be used for controlling a fuel metering valve of a gas turbine engine. The present disclosure generally describes a modified proportional and integral gain control loop for controlling a position actuation system component. Broadly speaking in the context of a fuel metering valve, a method of the present disclosure determines an error value between a desired position of the fuel metering valve and an actual position of the fuel metering valve. Based at least in part on that error value, the method determines (or, rather, chooses) an initial integral gain and an initial proportional gain from sets of predetermined values. However, instead of just summing the error value multiplied by the initial proportional gain and the error value multiplied by the initial integral gain, certain aspects of the present disclosure incorporate an integral gain scaler and a proportional gain scaler to update the initial integral and proportional gains based on real-time data. For example, the method may determine a final integral gain by multiplying the sum of the initial integral gain and the integral gain scalar by the error value, and may similarly determine a final proportional gain by multiplying the sum of the initial proportional gain and the proportional gain scalar by the error value. The method may then sum the final integral gain, the final proportional gain, as well as an offset value in calculating a null current value for the fuel metering valve. The integral gain scaler, proportional gain scaler, and/or offset value may each be at least in part derived from a sensed scheduling parameter of the gas turbine engine. A gas turbine engine controlled in such a manner may be more responsive to a user input and may also operate more consistently in steady state conditions.

Figure 1:
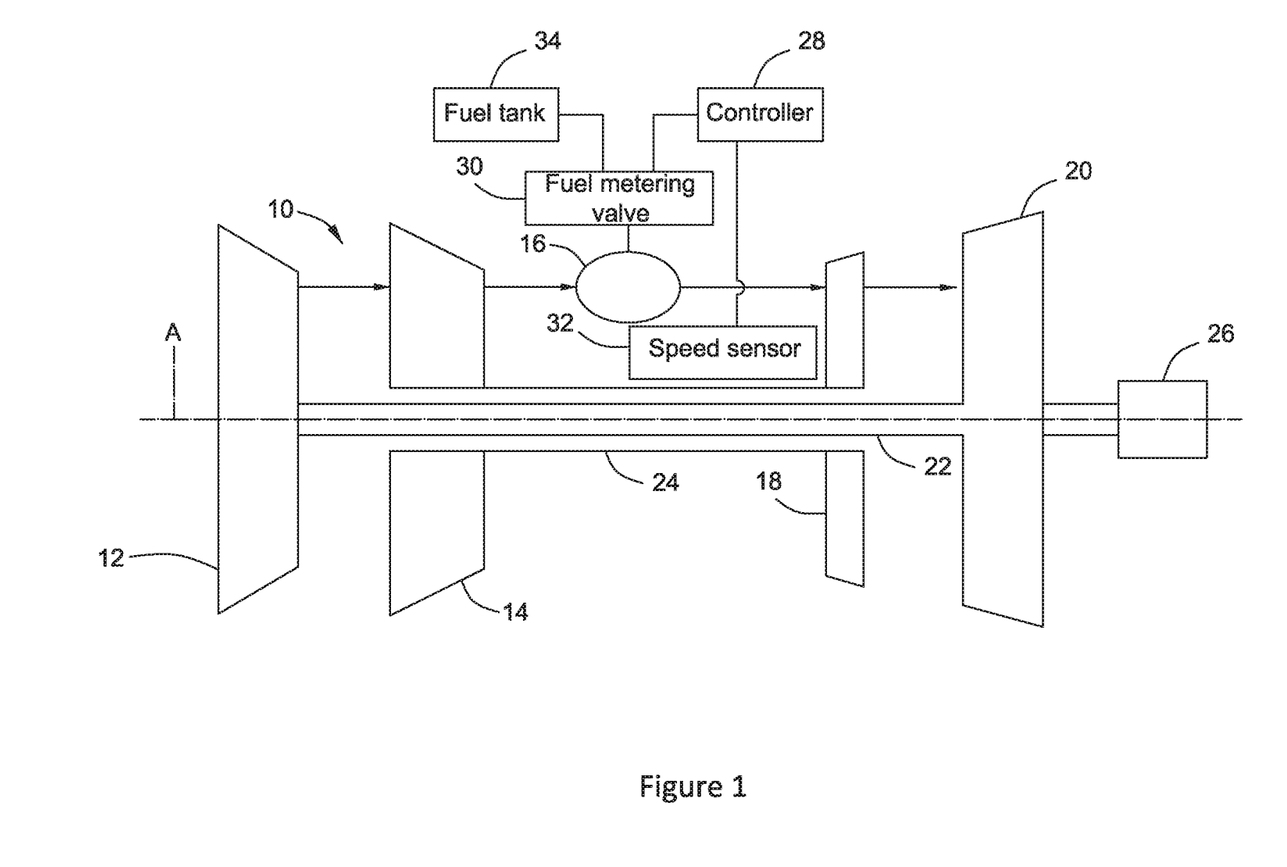
FIG. 1 is a schematic view of an aeroderivative gas turbine engine in accordance with an exemplary embodiment of the present disclosure.

Referring specifically to FIG. 1 a schematic view of an aeroderivative gas turbine engine 10 in accordance with an exemplary embodiment of the present disclosure is provided. The aeroderivative gas turbine engine 10 of FIG. 1 is of the type having a low pressure (LP) compressor 12, a high pressure (HP) compressor 14 positioned downstream of LP compressor 12, a combustion section 16 positioned downstream of HP compressor 14, a high pressure (HP) turbine 18 positioned downstream of combustion section 16, and a low pressure (LP) turbine 20 positioned downstream of HP turbine 18. At least certain components of the LP compressor 12, HP compressor 14, HP turbine 18, and LP turbine 20 rotate about a longitudinal axis A of the gas turbine engine 10. The standard configuration for engines of this type is a dual concentric shafting arrangement, whereby the LP turbine 20 is drivingly connected to the LP compressor 12 by a low pressure (LP) shaft 22 and the HP turbine 18 is similarly drivingly connected to the HP compressor 14 by a high pressure (HP) shaft 24 concentric with the LP shaft 22.

Further, for the embodiment depicted, the gas turbine engine is an aeroderivative gas turbine engine, such as a marine aeroderivative gas turbine engine. Accordingly, as is depicted schematically, the LP shaft 22 is mechanically coupled to a load 26. In certain exemplary embodiments, for example, the load 26 may be a propeller of a nautical vessel.

A controller 28 is included to control certain aspects of the gas turbine engine 10. The controller 28 may include memory and/or one or more processors for executing instructions stored in memory. For example, the controller 28 may be configured to execute the methods (200), (300) described below with reference to FIGS. 2 and 3, respectively. It should be appreciated, that as used herein, the term "processor" refers not only to integrated circuits referred to in the art as being included in a computer, but also refers to a controller, a microcontroller, a microcomputer, a programmable logic controller (PLC), an application specific integrated circuit, a microprocessor integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements.

For the embodiment of FIG. 1, the controller 28 is operably connected to a fuel metering valve 30 and one or more sensors. For example, the gas turbine engine 10 includes a speed sensor 32 for determining a rotational speed of the HP shaft 24. The speed of the HP shaft 24, which is typically referred to as a core speed of the gas turbine engine 10, may be indicative of an overall power level of the gas turbine engine 10. Additionally, although not depicted, the gas turbine engine may also include pressure and/or temperature sensors, detecting various conditions of, e.g., the compressor section, the turbine section, combustion section 16, and/or an ambient environment.

Further, the fuel metering valve 30 is provided to control an amount of fuel provided to the combustion section 16 from a fuel tank 34. The exemplary fuel metering valve 30 controls the amount of fuel provided to the combustion section 16 in response to an electrical current provided thereto by the controller 28. More specifically, in certain embodiments, the electrical current provided to a fuel metering valve actuation system including the fuel metering valve 30 may activate a solenoid within the fuel metering valve 30 such that a certain amount of fuel may flow therethrough. The position of the fuel metering valve 30, or rather the position of the solenoid, thus dictates a fuel to air ratio within the combustion section 16. Additionally, the fuel to air ratio controls a power output of the engine in response to a load demand on the engine. The electrical current provided to the solenoid of the fuel metering valve 30 may be referred to herein as a null current.

It should be appreciated that the exemplary gas turbine engine 10 depicted in FIG. 1 and described above is provided by way of example only, and that in other exemplary embodiments, aspects of the present disclosure may be incorporated into any other suitable gas turbine engine. For example, in other exemplary embodiments, aspects of the present disclosure may be incorporated into an aeronautical gas turbine engine, such as a turbofan engine, a turbojet engine, a turboprop engine, turboshaft engine, etc. With such an embodiment, the LP shaft 22 may not be mechanically coupled to the load 26, and the gas turbine engine 10 may further include an exhaust section configured to generate thrust. Additionally, or alternatively, aspects of the present disclosure may be incorporated an industrial gas turbine engine configured for generating power. With such an embodiment the gas turbine engine may further include, e.g., an inlet section having one or more adjustable inlet guide vanes. Furthermore, in still other exemplary embodiments, aspects of the present disclosure may be incorporated into any other suitable marine propulsion gas turbine engine. For example, in certain embodiments, the gas turbine engine may not include the LP compressor 12.

Figure 2:
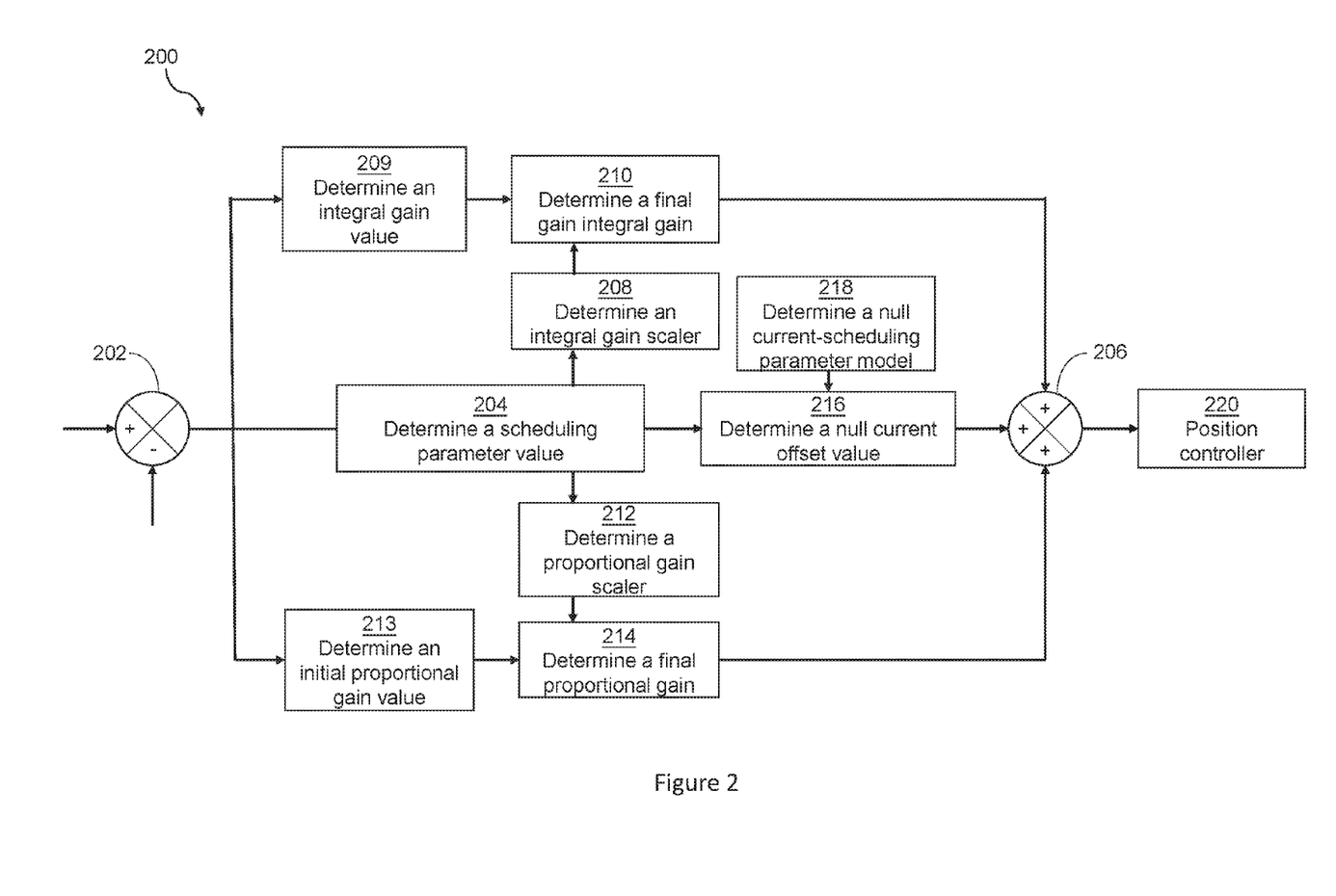
FIG. 2 is a flow diagram of a method for controlling a position actuation system component of a gas turbine engine in accordance with an exemplary aspect of the present disclosure.

Referring now to FIG. 2, a flow diagram is provided of a method (200) in accordance certain exemplary aspects of the present disclosure for controlling a position actuation system component in a gas turbine engine. For example, in certain exemplary aspects, the exemplary method (200) may be used for controlling a fuel metering valve of a gas turbine engine, such as the fuel metering valve 30 of the gas turbine engine 10 described above with reference to FIG. 1. It should be appreciated, however, that in other exemplary aspects, the exemplary method (200) may additionally, or alternatively, be used to control any other fuel system component or any variable geometry component of a gas turbine engine. For example, in other exemplary aspects, the exemplary method (200) may be used to control variable stator vanes, inlet guide vanes, an engine nozzle area, blocker doors, variable area bypass injectors, etc.

The exemplary method (200) generally includes at (202) determining an error value between a demand signal for the position actuation system component and a position signal of the position actuation system component. For example, if the position actuation system component is a fuel metering valve, the demand signal for the fuel metering valve may be derived from a desired operating speed received from an operator of the gas turbine engine through a user input device. For example, if the exemplary method is used to control a marine aeroderivative engine, the demand signal for the fuel metering valve may be derived from a position of a throttle of a marine vessel. Additionally, the position signal of the fuel metering valve may be received from a sensor on or adjacent to the fuel metering valve to determine an actual, real-time position of the fuel metering valve.

The method (200) of FIG. 2 also includes at (204) determining a scheduling parameter value of the gas turbine engine. The scheduling parameter may be any parameter indicative of a power level of the gas turbine engine. For example, in certain exemplary aspects, the scheduling parameter may be a core speed of the gas turbine engine (e.g., a rotational speed of a high pressure shaft). However, in other exemplary aspects, the scheduling parameter may alternatively be, for example, an engine pressure ratio, a power turbine speed, a hydraulic pressure of the gas turbine engine, etc.

The error value determined at (202) and scheduling parameter value determined at (204) are generally used to determine a null current value for the position actuation system component at (206). The null current value may refer generally to an amount of current required to maintain the position actuation system component at a desired position. For example, if the position actuation system component is a fuel metering valve, the null current value may be an amount of current required to maintain a solenoid of the fuel metering valve at a position to allow a desired amount of fuel flow to a combustor assembly of the gas turbine engine.

Determining the null current value at (206) generally includes determining at (208) an integral gain scaler. In certain exemplary aspects, the integral gain scaler may be determined at (208) as a function of the scheduling parameter value determined at (204). Alternatively, the integral gain scaler may be determined at (208) as a function of both the error value determined at (202) and the scheduling parameter value determined at (204). For example, in certain exemplary aspects, determining the integral gain scaler at (208) may include looking up the integral gain scaler in an integral gain scaler lookup table with the error value determined at (202) and the scheduling parameter determined at (204) as variables. Accordingly, the integral gain scalar determined at (208) is a function of the real-time value of the scheduling parameter determined at (204). The integral gain scaler lookup table may be based on, for example, experimental data from the gas turbine engine, information regarding a configuration of the gas turbine engine in, e.g., a nautical vessel, testing of the gas turbine engine, etc.

Additionally, an initial integral gain value is determined at (209). The initial integral gain value may be a value determined based on the error value determined at (202), as well as previously determined error values. For example, determining at (209) the initial integral gain value may include looking up the initial integral gain value in a lookup table of predetermined integral gain values sorted by error values. The integral gain scaler determined at (208) may be added to the initial integral gain value determined at (209) and multiplied by the error value determined at (202) to determine a final integral gain at (210). Accordingly, the final integral gain determined at (210) is a function of the error value determined at (202), updated based on the real-time value of the scheduling parameter determined at (204) via the integral gain scalar determined at (208).

Further, for the embodiment of FIG. 2, determining the null current value at (206) also includes determining a proportional gain scaler at (212). In certain exemplary aspects, the proportional gain scaler may be determined at (212) as a function of the scheduling parameter value determined at (204). Alternatively, the proportional gain scaler may be determined at (212) as a function of both the error value determined at (202) and the scheduling parameter value determined at (204). For example, similar to determining the integral gain scaler at (208), determining the proportional gain scaler at (212) may include looking up the proportional gain scaler in a proportional gain scaler lookup table with the error value determined at (202) and the scheduling parameter determined at (204) as variables. Accordingly, the proportional gain scalar determined at (212) is a function of the real-time value of the scheduling parameter determined at (204). The proportional gain scaler lookup table may be based on, for example, experimental data from the gas turbine engine, information regarding a configuration of the gas turbine engine in, e.g., a nautical vessel, testing of the gas turbine engine, etc.

Additionally, an initial proportional gain value is determined at (213). The initial proportional gain value may be a value determined based on the error value determined at (202). For example, determining at (213) the initial proportional gain value may include looking up the initial proportional gain value in a lookup table of predetermined proportional gain values sorted by error values. The proportional gain scaler determined at (212) may be added to the initial proportional gain value determined at (213) and multiplied by the error value determined at (202) to determine a final proportional gain at (214). Accordingly, the final proportional gain determined at (214) is a function of the error value determined at (202), updated based on the real-time value of the scheduling parameter determined at (204) via the proportional gain scalar determined at (212).

Moreover, for the embodiment of FIG. 2, determining at (206) the null current value also includes determining a null current offset value at (216). The null current offset value determined at (216) may be determined as a function of the scheduling parameter determined at (204). For example, as will be discussed in greater detail below with reference to FIG. 3, in certain exemplary aspects, determining the null current offset value may include determining a null current-scheduling parameter model for the gas turbine engine at (218). The null current-scheduling parameter model may be a two-variable linear equation model including as variables a null current value and a scheduling parameter value. However, in other exemplary aspects, the null current-scheduling parameter model may instead be a more complex polynomial model (e.g., a second degree polynomial equation, a third degree polynomial equation, etc.). Alternatively, the null current-scheduling parameter model may be a stochastic model based on observed distribution of the scheduling parameter.

The exemplary method (200) may include determining the null current offset value at (216) based on the scheduling parameter determined at (204) and the null current-scheduling parameter model determined at (218). For example, determining the null current offset value at (216) may include determining a null current corresponding to the scheduling parameter determined at (204) using the null current-scheduling parameter model determined at (218).

Further, in certain exemplary aspects, the null current-scheduling parameter model may be a baseline model or an adaptive model, updated using real-time data (such as the adaptive model determined in the exemplary method (300) described below with reference to FIG. 3).

Referring still to FIG. 2, determining the null current value for the position actuation system component at (206) further includes adding the final integral gain determined at (210), the final proportional gain determined at (214), and the null current offset value determined at (216). The null current value determined at (206) is then provided to a position controller for the position actuation system component at (220). For example, if the position actuation system component is a fuel metering valve, providing the null current value to the position controller for the fuel metering valve at (220) may include providing an electrical current in an amount equal to the null current value to a solenoid of the fuel metering valve.

Figure 3:
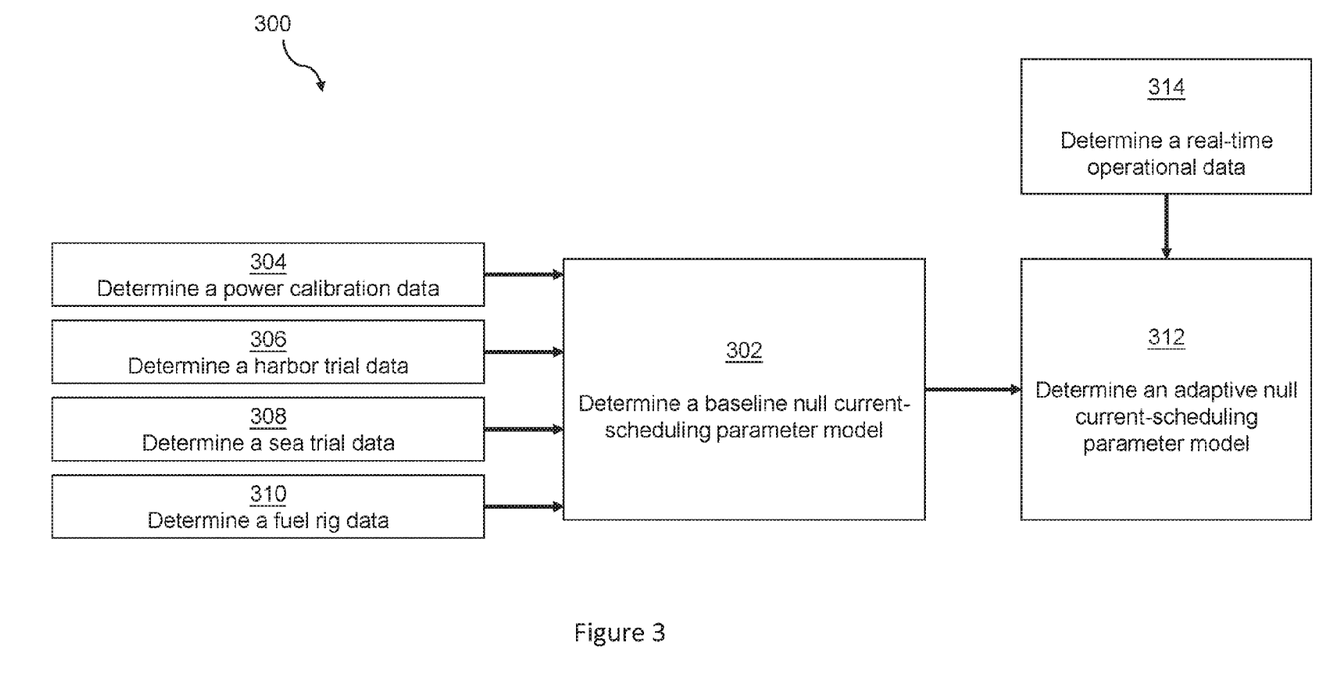
FIG. 3 is a flow diagram of a method for determining a null current-scheduling parameter model for a gas turbine engine in accordance with an exemplary aspect of the present disclosure.

Referring now to FIG. 3, a flow diagram of an exemplary method (300) for determining a null current-scheduling parameter model for a gas turbine engine is provided. In certain exemplary aspects, determining a null current-scheduling parameter model for the gas turbine engine at (218) in the exemplary method (200) may include one or all of the exemplary aspects of the method (300) depicted in FIG. 3.

The exemplary method (300) includes determining a baseline null current-scheduling parameter model for a gas turbine engine at (302). Determining the baseline null current-scheduling parameter model at (302) may include determining the baseline null current-scheduling parameter model using testing data of the gas turbine engine. More specifically, for the exemplary aspect depicted, determining the baseline null current-scheduling parameter model at (302) includes receiving power calibration data determined at (304), receiving harbor trial data determined at (306), receiving sea trial data determined at (308), and receiving fuel rig data determined at (310). Determining the power calibration data at (304) may include collecting information regarding the gas turbine engine in a test cell. Determining the harbor trial data at (306) and the sea trial data at (308) may include collecting field data for the gas turbine engine. Additionally, determining fuel rig data at (310) may include testing a fuel system of the gas turbine engine.

Figure 4:
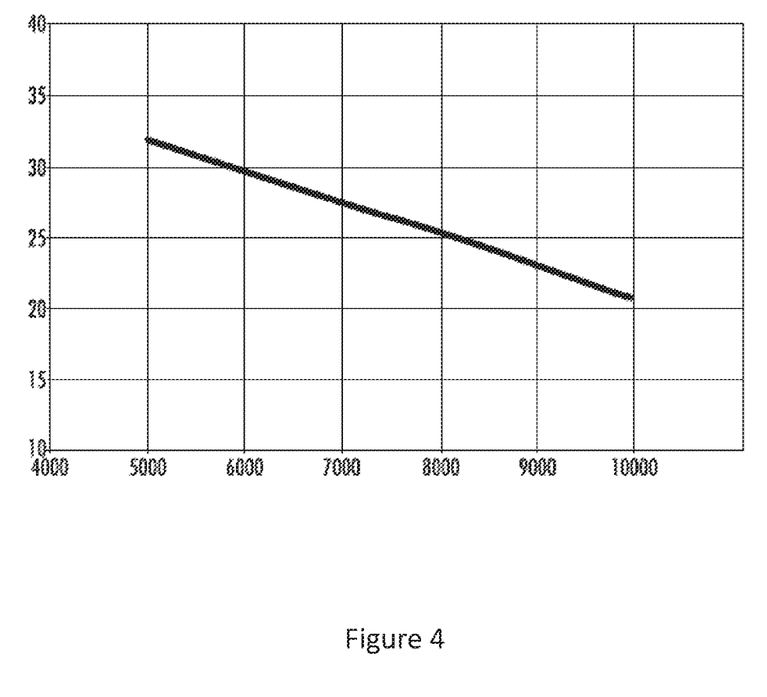
FIG. 4 is a graph of a baseline null current-scheduling parameter model for a gas turbine engine in accordance with an exemplary embodiment of the present disclosure.

Referring now also to FIG. 4, an exemplary baseline null current-scheduling parameter model is provided. The exemplary baseline null current-scheduling parameter model of FIG. 4 may be determined at (302) in the exemplary method (300) of FIG. 3. For the embodiment depicted, the baseline null current-scheduling parameter model is a two-variable linear equation model including as variables a null current value (Y-axis) and a scheduling parameter value (X-axis; such as the scheduling parameter value determined at (204) in the exemplary method (200) of FIG. 2). For the exemplary embodiment depicted, the baseline null current-scheduling parameter model is a baseline null current-core speed liner model taking the form of: "$y=mx+b$", wherein the variable "$y$" is a null current value, wherein the variable "$x$" is a core speed value of the gas turbine engine, and wherein the constants "$m$" and "$b$" are values specific to a given gas turbine engine and fuel system configuration determined at (302). Accordingly, with the exemplary embodiment of FIG. 4, providing the null current-core speed model with a core speed value of the gas turbine engine will yield a null current value for the gas turbine engine corresponding to such core speed.

Referring still to FIG. 3, the exemplary method (300) further includes at (312) determining an adaptive null current-scheduling parameter model by updating the baseline null current-scheduling parameter model using real-time operational data of the gas turbine engine determined at (314). The real-time operational data of the gas turbine engine determined at (314) may include a real-time null current value and a real-time scheduling parameter value (such as the scheduling parameter value determined at (204) in the exemplary method (200) of FIG. 2).

More specifically, for the exemplary aspect depicted, determining an adaptive null current-scheduling parameter model by updating the baseline null current-scheduling parameter model at (312) includes recursively estimating the adaptive null current-scheduling parameter model based on the real-time operational data of the gas turbine engine determined at (314). For example, determining real-time operational data of the gas turbine engine at (314) may include collecting scheduling parameter values and null current values multiple times a second during operation of the gas turbine engine. Additionally, updating the baseline null current-scheduling parameter model at (312) may also include updating the baseline null current-scheduling parameter model as frequently or less frequently than the collection of scheduling parameter values in all current values.

In certain exemplary aspects, recursively estimating the adaptive null current-scheduling parameter model may include using any suitable linear regression equation. Accordingly, as will be understood given the present disclosure, in certain exemplary aspects, recursively estimating the adaptive null current-scheduling parameter model may include using a least mean squares algorithm, least-squares, weighted least squares, etc.

A gas turbine engine having a position actuation system component operated in accordance with the exemplary methods (200) and (300) described herein may have quicker startup times and less variation in the null current values provided to the position actuation system component during steady state operating conditions. Moreover, by updating the baseline null current-scheduling parameter model with real-time operational data to arrive at an adaptive null current-scheduling parameter model, the exemplary methods (200) and (300) may take into account, e.g., ambient conditions and varying conditions of the gas turbine engine while controlling the position actuation system component. For example, if the position actuation system component is a fuel metering valve, the exemplary methods (200) and (300) may take into account and compensate for changes in the fuel system due to, for example, ambient temperature changes, ambient pressure changes, fuel temperature changes (e.g., changes in fuel viscosity), hydraulic fluid temperature changes (e.g., changes in hydraulic fluid viscosity), and an age of the fuel system. Accordingly, such a configuration may result in a more responsive and consistent gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a position actuation system component in a gas turbine engine, the method comprising:
    determining an error value between a demand signal for the position actuation system component and a position signal of the position actuation system component by a controller;
    determining a scheduling parameter value of the gas turbine engine by a sensor, wherein the scheduling parameter value is a core speed of the gas turbine engine; and
    determining a null current value for the position actuation system component by the controller, wherein determining the null current value includes:
        determining an integral gain scaler based on the scheduling parameter value;
        determining an integral gain based on the error value and the integral gain scaler;
        determining a proportional gain scaler based on the scheduling parameter value;
        determining a proportional gain based on the error value and proportional gain scaler;
        adding the integral gain and the proportional gain to determine the null current value; and
        using the null current value to set the position actuation system at a desired position.

2. The method of claim 1, wherein the position actuation system component is a fuel metering valve.

3. The method of claim 1, wherein determining the null current value further includes
    determining a null current offset value as a function of the scheduling parameter value; and
    adding the null current offset value to the integral gain and the proportional gain to determine the null current value.

4. The method of claim 3, wherein determining the null current offset value based on the scheduling parameter value includes
    determining a first baseline null current-scheduling parameter model for the gas turbine engine; and
    determining the null current offset value based on the scheduling parameter value and the first baseline null current-scheduling parameter model.

5. The method of claim 4, wherein determining the first baseline null current-scheduling parameter model includes determining the first baseline null current-scheduling parameter model using testing data of the gas turbine engine.

6. The method of claim 4, wherein the baseline null current-scheduling parameter model is a two-variable linear equation model including as variables the null current value and the scheduling parameter value, the first baseline null current-scheduling parameter model taking the form of: y=mx+b, wherein y is the null current value, x is the scheduling parameter value, and m and b are constants.

7. The method of claim 3, wherein determining the null current offset value based on the scheduling parameter value includes
    determining a first baseline null current-scheduling parameter model for the gas turbine engine;
    determining an second baseline null current-scheduling parameter model by updating the first baseline null current-scheduling parameter model using real-time operational data of the gas turbine engine, wherein the second baseline null current-scheduling parameter model is an adaptive model; and
    determining the null current offset value based on the scheduling parameter value and the second baseline null current-scheduling parameter model.

8. The method of claim 7, wherein the real-time operational data of the gas turbine engine includes the null current value and the scheduling parameter value in real time.

9. The method of claim 7, wherein determining the second baseline null current-scheduling parameter model by updating the first baseline null current-scheduling parameter model includes recursively estimating the second baseline null current-scheduling parameter model.

10. The method of claim 9, wherein recursively estimating the second baseline null current-scheduling parameter model includes using a least mean squares algorithm.

11. The method of claim 1, wherein determining the integral gain scaler based on the scheduling parameter value includes determining the integral gain scaler based on the scheduling parameter value and the error value, and wherein determining the integral gain based on the error value and the integral gain scaler includes multiplying a sum of the integral gain scaler and an initial integral gain by the error value.

12. The method of claim 1, wherein determining the proportional gain scaler based on the scheduling parameter value includes determining the proportional gain scaler based on the scheduling parameter value and the error value, and wherein determining the proportional gain based on the error value and the proportional gain scaler includes multiplying a sum of the proportional gain scaler and an initial proportional gain by the error value.

13. The method of claim 1, further comprising
    providing an electrical current equal to the null current value to a position controller for the position actuation system component.

14. A gas turbine engine comprising:
    a combustor assembly disposed between a compressor section and a turbine section;
    a fuel metering valve controlling an amount of fuel provided to the combustor assembly;
    a sensor for determining a scheduling parameter value of the gas turbine engine, wherein the scheduling parameter value is a core speed of the gas turbine engine; and a controller operably connected to the fuel metering valve and the sensor, the controller configured to determine an error value between a fuel metering valve demand signal and a position of the fuel metering valve;

determine an integral gain scaler based on the scheduling parameter value; determine an integral gain based on the error value and the integral gain scaler;

determine a proportional gain scaler based on the scheduling parameter value;

determine a proportional gain based on the error value and proportional gain scaler;

add the integral gain and the proportional gain to determine a null current value; and use the null current value to set the position actuation system at a desired position.

15. The gas turbine engine of claim 14, wherein in determining the null current value, the controller is further configured to determine a null current offset value based on the scheduling parameter value; and add the null current offset value to the integral gain and the proportional gain to determine the null current value.

16. The gas turbine engine of claim 15, wherein in determining the null current offset value, the controller is further configured to determine a first baseline null current-scheduling parameter model for the gas turbine engine; and determine the null current offset value based on the scheduling parameter value and the first baseline null current-scheduling parameter model.

17. The gas turbine engine of claim 15, wherein in determining the null current offset value, the controller is further configured to determine a first baseline null current-scheduling parameter model for the gas turbine engine;

determine an second baseline null current-scheduling parameter model by updating the first baseline null current-scheduling parameter model using real-time operational data of the gas turbine engine, wherein the second baseline null current-scheduling parameter model is an adaptive model; and determine the null current offset value based on the scheduling parameter value and the second baseline null current-scheduling parameter model.

18. The gas turbine engine of claim 14, wherein the gas turbine engine is an aeroderivative gas turbine engine.

* * * * *